United States Patent
Kalaboukis

(10) Patent No.: US 10,425,668 B2
(45) Date of Patent: Sep. 24, 2019

(54) SYSTEM AND METHOD FOR VIDEO CONVERSATIONS

(71) Applicant: OATH INC., New York, NY (US)

(72) Inventor: Chris Kalaboukis, San Jose, CA (US)

(73) Assignee: OATH INC., New York, NY (US)

(*) Notice: Subject to any disclaimer, the term of this patent is extended or adjusted under 35 U.S.C. 154(b) by 0 days.

(21) Appl. No.: 15/682,319

(22) Filed: Aug. 21, 2017

(65) Prior Publication Data

US 2017/0353746 A1 Dec. 7, 2017

Related U.S. Application Data

(63) Continuation of application No. 11/742,330, filed on Apr. 30, 2007, now Pat. No. 9,743,120.

(51) Int. Cl.

| H04N 21/236 | (2011.01) |
|---|---|
| H04N 7/173 | (2011.01) |
| H04N 21/234 | (2011.01) |
| H04N 21/2389 | (2011.01) |
| H04N 21/434 | (2011.01) |

(Continued)

(52) U.S. Cl.
CPC ... *H04N 21/23614* (2013.01); *H04N 7/17318* (2013.01); *H04N 21/23424* (2013.01); *H04N 21/23892* (2013.01); *H04N 21/4348* (2013.01); *H04N 21/44016* (2013.01); *H04N 21/472* (2013.01); *H04N 21/8106* (2013.01)

(58) Field of Classification Search
CPC .......... H04N 21/2225; H04N 21/2311; H04N 21/232; H04N 21/47202; H04N 21/4361; H04N 21/64707
See application file for complete search history.

(56) References Cited

U.S. PATENT DOCUMENTS

| 5,732,216 A | 3/1998 | Logan et al. |
|---|---|---|
| 7,200,857 B1 | 4/2007 | Rodriguez et al. |

(Continued)

FOREIGN PATENT DOCUMENTS

| WO | 2007084867 | 7/2007 |
|---|---|---|
| WO | 2007084869 | 7/2007 |

(Continued)

OTHER PUBLICATIONS

U.S. Appl. No. 11/622,948, filed Jan. 12, 2007 to Folgner et al.

*Primary Examiner* — Benjamin R Bruckart
*Assistant Examiner* — Anthony Bantamoi
(74) *Attorney, Agent, or Firm* — James J. DeCarlo; Greenberg Traurig, LLP

(57) ABSTRACT

This disclosure describes methods and systems for viewing a collection of media objects, such as a video clip and associated responses (video, audio and text), in a seamless way. Provided with a media object and a series of responses and counter responses, a real time media combining methodology is coupled with a text and audio conversion process to generate a media stream, or downloadable media object, that contains the original media object and some or all of the associated responses. The media content is formatted into the stream so that ancillary content, like text associated with a particular video response, may also be displayed. Advertisements may be inserted into the stream between responses or overlaying some portion of the viewing area during rendering of the stream.

16 Claims, 4 Drawing Sheets

(51) Int. Cl.
　　　　*H04N 21/44*　　　(2011.01)
　　　　*H04N 21/472*　　(2011.01)
　　　　*H04N 21/81*　　　(2011.01)

(56) References Cited

U.S. PATENT DOCUMENTS

| | | |
|---|---|---|
| 8,411,758 B2 | 4/2013 | Folgner et al. |
| 8,868,465 B2 | 10/2014 | Folgner et al. |
| 2002/0154157 A1 | 10/2002 | Sherr et al. |
| 2003/0182663 A1 | 9/2003 | Gudorf et al. |
| 2004/0221323 A1* | 11/2004 | Watt ................ H04N 7/16 725/135 |
| 2006/0064728 A1 | 3/2006 | Son et al. |
| 2007/0169158 A1 | 7/2007 | Folgner et al. |
| 2008/0091839 A1 | 4/2008 | Mitchell et al. |
| 2008/0092182 A1 | 4/2008 | Conant |
| 2008/0148152 A1 | 6/2008 | Blinnikka et al. |
| 2008/0184122 A1 | 7/2008 | Grant et al. |
| 2008/0196071 A1 | 8/2008 | Manthoulis |
| 2008/0215620 A1 | 9/2008 | Folgner et al. |
| 2008/0263585 A1 | 10/2008 | Gell et al. |
| 2009/0103835 A1 | 4/2009 | Folgner et al. |

FOREIGN PATENT DOCUMENTS

| | | |
|---|---|---|
| WO | 2007084870 | 7/2007 |
| WO | 2007084871 | 7/2007 |

\* cited by examiner

SYSTEM AND METHOD FOR VIDEO CONVERSATIONS

CROSS REFERENCE TO RELATED APPLICATION

This application is a continuation of, and claims priority from co-pending U.S. patent application Ser. No. 11/742,330, filed Apr. 20, 2007, which is incorporated herein by reference.

BACKGROUND

It is now common to allow users to post responses on a web page to comment on, review or respond to some content item or subject of interest. Recently, in addition to allowing text responses, many web sites are allowing users to post video responses as well. Such video responses are often short video clips produced by the respondent, for example by using a webcam attached to the respondent's computer.

Viewing such video responses, however, is currently not a very accommodating process. For example, to view a video response on the popular web site WWW.YOUTUBE.COM, a viewer must first access a web page featuring the original content item that video response relates to, then click on a "view video responses" icon to access another page with a listing of the video responses, then click on each video response to render the response on the viewer's computer. If the number of video responses is large, the user may also have to click between different web pages of the listing. Thus viewing video responses is a completely manual process requiring significant user interaction on the part of the viewer.

Often, video responses are associated with text comments or other content separate from the video response and provided either by the respondent or the web site operator. Such content may be pertinent to understanding the video response and is usually displayed next to the video response. This further complicates the viewing of the video response.

SUMMARY

This disclosure describes methods and systems for viewing a collection of video clips and responses (video, audio and text) in a seamless way. When a video clip or other media object is posted to a web site, users viewing the video have the option to respond to the video with a text response (e.g., typed into the site) or by posting an audio response or a video response (e.g., uploaded to the site after they create it). This creates an initial media object and a series of responses and counter responses. In an embodiment, a real time media combining methodology is coupled with a text and audio conversion process to generate a media stream that contains the video clip and some or all of the associated responses.

The disclosure includes a description of embodiments of a method for streaming a video clip and at least one video response associated with the video clip. The method includes publishing the video clip for viewing by consumers and receiving at least one video response associated with the video clip. The method further includes transmitting, to a user's computing device, a first interface with a control element that, upon selection, generates a request to sequentially render the video clip and at least one associated video response on the user's computing device. Subsequently, the user selects the control and the request is received from the user's computing device. The method then retrieves the video clip and at least one associated video response and transmits them, in response to the request, to the user's computing device. Embodiments of the method further include generating a stream of video data containing the video clip followed by the at least one video response and transmitting the stream of video data to the user's computing device.

The disclosure also describes a system for distributing video that includes a video datastore containing a plurality of video clips and, for at least one first video clip, a set of one or more associated video responses to the video clip; a search module that allows a user to search for video clips; a video streaming module that generates a stream of video data containing a first video clip and the set of associated video responses in a sequence; and a transmission module that transmits the stream of video data in response to a request from a user to view the video clip and the set of associated video responses.

The disclosure also describes a computer-readable medium comprising computer-executable instructions for performing a method for streaming a plurality of media object responses associated with an original media object. The method includes publishing the original media object for rendering by consumers and receiving the plurality of media object responses associated with the original media object from the consumers. The method further includes transmitting, to a user's computing device, a first interface with a control element that, upon selection, generates a request to sequentially render at least some of the plurality of media object responses on the user's computing device. A request from the user's computing device to sequentially render the at least some of the plurality of media object responses is then received. The method then retrieves the at least some of the plurality of media object responses identified by the request and transmits them to the user's computing device. The media object responses may be transmitted as part of a single stream of video data or may be transmitted individually for sequential rendering by the user's computing device.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

This disclosure describes methods and systems for viewing a collection of media objects, such as a video clip and associated responses (video, audio and text), in a seamless way. Provided with a media object and a series of responses and counter responses, a real time media combining methodology is coupled with a text and audio conversion process to generate a media stream, or downloadable media object, that contains the original media object and some or all of the associated responses. The media content is formatted into the stream so that ancillary content, like text associated with a particular video response, may also be displayed. Advertisements may be inserted into the stream between responses or overlaying some portion of the viewing area during rendering of the stream.

Figure 1:
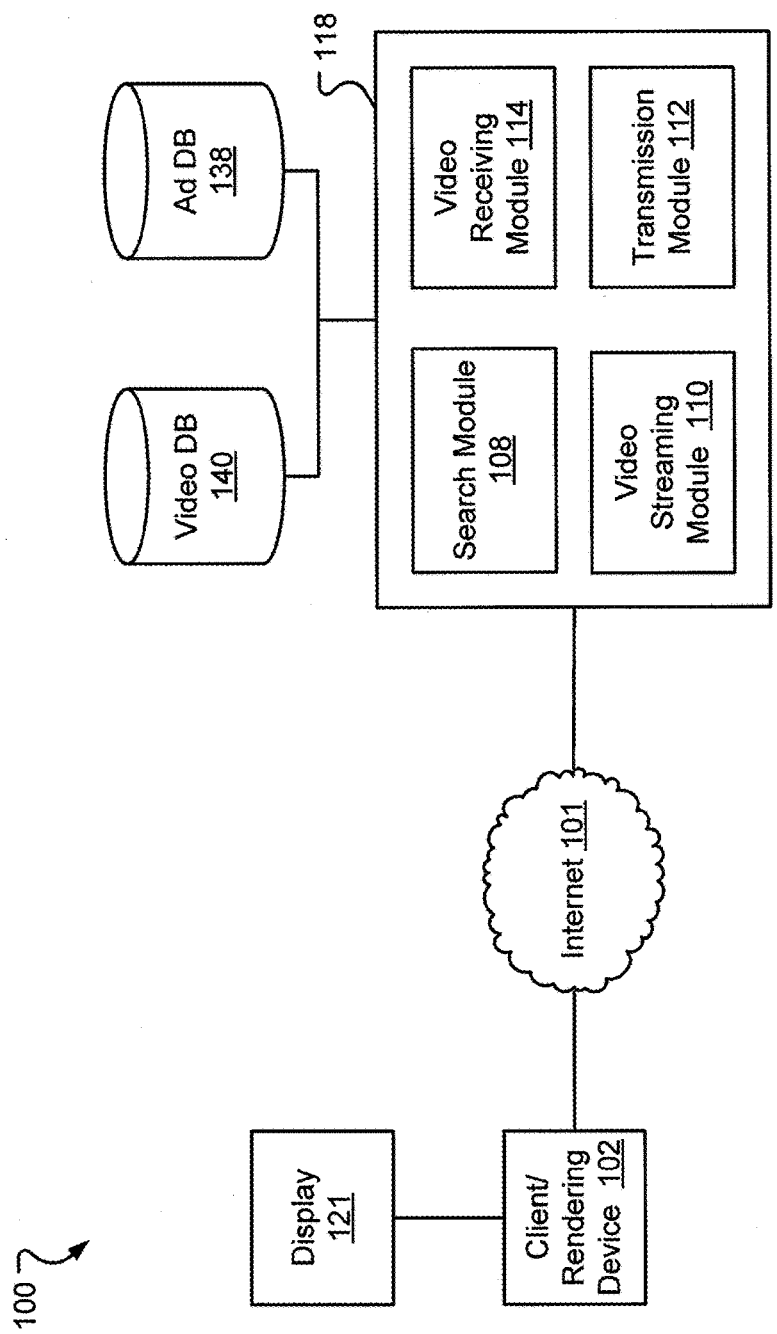
FIG. 1 illustrates an embodiment of an architecture for viewing a collection of associated video clips.

FIG. 1 illustrates an embodiment of an architecture for viewing a collection of associated video clips. The architecture 100 is a computing architecture in which media content may transmitted between devices for viewing by consumers. The architecture 100 illustrated is a networked client/server architecture in which a rendering device (referred to as a "client") 102 issues media requests to a remote computing device (referred to as a "server") 118 that responds by transmitting the requested media content to the client 102 for rendering to a user. The systems and methods described herein are suitable for use with other architectures as will be discussed in greater detail below.

The client 102 is alternatively referred to as a rendering device as, in addition to being able to receive, in some embodiments store, media content transmitted from remote sources, it further is capable of rendering (playing or displaying) such content to its user. Rendering devices may be able to load and play different formats of video including MPEG, DivX, Xvid, AMV and SigmaTel Motion Video (SMV); audio including MP3, WAV, and Ogg Vorbis; digital images, including BMP, JPEG, and GIF; and interactive media, such as flash animations.

To support this rendering capability, the client 102 may be a single purpose device consisting completely or primarily as hardware elements and, possibly, firmware or unchangeable sets of software instructions. Alternatively, and as shown in FIG. 1, a rendering device may also be a computing device capable of obtaining and executing different software applications as needed. For the purposes of this disclosure, a computing device such as the client 102 or server 118 includes a processor and memory for storing and executing data and software. Computing devices may be provided with operating systems that allow the execution of software applications in order to manipulate data. In the embodiment shown, the client 102 is a computing device, such as a personal computer (PC), web-enabled personal data assistant (PDA), a smart phone, a portable media player device such as an IPOD, or a smart TV set top box.

In the embodiment shown, the client 102 is connected to the Internet 101 via a wired data connection or wireless connection such as a wi-fi network, a WiMAX (802.16) network, a satellite network or cellular telephone network. In an alternative embodiment, the client 102 may be connected to the source of the media content via a private network or a direct connection.

In the embodiment shown, the client 102 includes an application (not shown) for rendering media content. Such applications are commonly referred to as media player applications. Examples of such applications include WINDOWS MEDIA PLAYER and YAHOO! MUSIC JUKEBOX. The media player application, when executed, may generate a graphical user interface (GUI) on a display 121 attached to or part of the computing device 102. Alternatively, the GUI may be a web page provided by the server 118 that uses the media player in an "embedded" mode. An example of a GUI is illustrated and discussed in FIG. 4. The GUI includes a set of user-selectable controls through which the user of the client device 102 may control the rendering of the media content. For example, the GUI may include a button control for each of the play-pause-rewind-fast forward commands commonly associated with the rendering of media on rendering devices. By selection of these controls, the user may cause the client 102 to render media content from local storage or from a remote source (e.g., a remote database, storage device or server) and control the rendering of the content to the user.

The architecture 100 includes a server 118, which may be a single server or a group of servers acting together. A number of program modules and data files may be stored in a mass storage device and RAM of the server 118, including an operating system suitable for controlling the operation of a networked server computer, such as the WINDOWS XP or WINDOWS 2003 operating systems from MICROSOFT CORPORATION. The client 102 is connected to the server 118 via a network, such as the Internet 101 as shown.

The server 118 is a media server that serves requests from the client for media content. In an embodiment, the server 118 may be part of a media file sharing system such as YOUTUBE, through which clients 102 may post new media content, view media content posted by others and/or post media content in response to media content posted by others. In the embodiment shown, the system includes a video receiving module 114 that receives media content, such as a video clip and any related information such as author name, date, time, textual content associated with the video clip, etc., from users and stores the content for later retrieval.

Such media content may be stored as a discrete media object (e.g., a media file containing renderable media data that conforms to some known data format) that is accessible to the server 118, as a group of associated media objects and records, or in some other manner that facilitates efficient storage and retrieval by the server 118 of all related content. In alternative embodiments, the server 118 may be part of different types of systems, such as communications systems, in which different media content from different sources may be collected, searched and retrieved to be rendered as a group.

In the embodiment shown in FIG. 1, media content takes the form of video content, or what is commonly referred to as "video clips." Video clips are segments (typically but not always short in length) of video content, which may be stored as discrete media files. In the file sharing embodiment, video clips discussed in this disclosure fall into two categories: root video clips and video clips that are responses to/associated with a root video clip. Note also that a response may be a root video clip for other responses and thus be a root video clip in one context and response in another. When discussing the file sharing embodiment, it is convenient to differentiate between the two types of video clips in order to clarify their interrelationship. Thus, root video clips will be referred to as either root video clips or video clips and a response to a video clip will be referred to as a video response if the response includes video content, a text response if the response is only textual, and an audio response if the response includes an audio component but no video component.

The server 118 is illustrated as being connected to a video clip database 140. The video clip database 140 stores various video objects that may be requested by the client 102. Local data structures, including discrete media objects such as media files, may be stored on a mass storage device, such as the video database 140. One or more mass storage devices may be connected to, or be part of, any of the devices described herein including the client 102 or a server 118. The mass storage device includes some form of computer-readable media and provides non-volatile storage of data for later use by one or more computing devices. Although the description of computer-readable media contained herein refers to a mass storage device, such as a hard disk or CD-ROM drive, it should be appreciated by those skilled in the art that computer-readable media may be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and that can be accessed by the computer.

The server 118 includes a search module 108 through which a client 102 may search for video clips stored in the video database 140. For example, clients 102 may search by keyword, author, subject matter, ratings, popularity, age, etc. The search module 108 receives search requests, such as through a user's interaction with a GUI on the display 121, and returns search results to the client 102 for display to the user. In an embodiment, the search results may be displayed via a search result GUI showing a listing of video clips that match the search criteria provided with the search request. From the results, a user may select a video clip to be transmitted to the client 102.

In an embodiment, the request for a video clip may result in transmission to the client 102 of a GUI (e.g., a web page for display on a browser or other application) specific to the selected video clip. In an embodiment, the user may request the selected video clip through controls on the video clip GUI. From this video clip GUI, the user is presented various information about the web clip such as a listing of any video responses to the selected video clip. This video clip GUI may be generated by the search module 108 upon receipt of the user's selection from the search results or other listing of video clips.

In the embodiment, the video clip GUI includes a control that allows a user to issue a consolidated render request. A consolidated render request is a request to view multiple media objects (in this embodiment video clips) in a single rendering operation. For example, the consolidated render request may be a request to view the video clip and all video responses. Alternatively, the consolidated render request may be a request to view all the video responses alone without viewing the root video clip. As discussed in greater detail below, the consolidated render request may also include user-selected criteria for selecting specific video responses for the group, all video responses to the root video clip, or user-selected criteria for ordering the video responses within the stream in a render sequence desired by the user (e.g., most popular video responses first).

In response to receiving a consolidated render request, a video streaming module 110 on the server 118 retrieves the necessary media content from the video database 140 and transmits the content to the client 102 for rendering to the user. As discussed in greater detail below, the video streaming module 110 may generate a stream of media data and transmit the stream to the client 102 in the same manner that a pre-existing media file would be streamed to a client 102 for rendering. In an alternative embodiment, the video streaming module 110 may transmit each component video clip/responses and any other necessary components individually to the client 102 from which the media player or some other module on the client 102 renders a seemingly continuous stream to the user.

As described below, the video streaming module 110 may also generate additional components such as transitions between the component video clip and video responses. These additional components could include information relating to the video clip and video responses, e.g., identifying the author of the subsequent component.

In addition, the video stream module 110 may transmit one or more advertisements with the response to the client 102, for example selecting and placing advertisements between two adjacent components. For example, in the embodiment shown an advertisement database 138 is connected to the server 118. The advertisement database 138 contains advertisements that may be selected, such as based on some predetermined criteria, for inclusion in responses to consolidated render requests. The operator of the server 118 is then capable of billing advertisers for placing advertisements in media streams viewed by its users. In an alternative embodiment (not shown), the video streaming module 110 may not select advertisements, but rather, transmit a request for one or more advertisements to an advertisement server. Other methods of obtaining advertisements are also possible and any suitable selection and obtaining method or system could be adapted for use with the systems described herein.

FIG. 1 presents one embodiment of a client/server architecture for issuing and responding to consolidated render requests. Other embodiments are also possible in which some functions or tasks are distributed between multiple modules or provided by remote services. Furthermore, although discussed in terms of video clips, as mentioned above the architecture 100 may equally be adapted to media objects of any type of media content including audio, video and textual. The architecture 100 may further be adapted to generate and stream different types of content in a single, combined video stream so that a viewer issuing a consolidated render request could render all responses regardless of content type for example, audio content being rendered concurrently with text identifying the audio content's author, video content being rendered as described above, and textual content being rendered on the display with a predetermined delay to allow for reading, or with a control allowing the viewer to start and stop the rendering of the stream.

Figure 2:
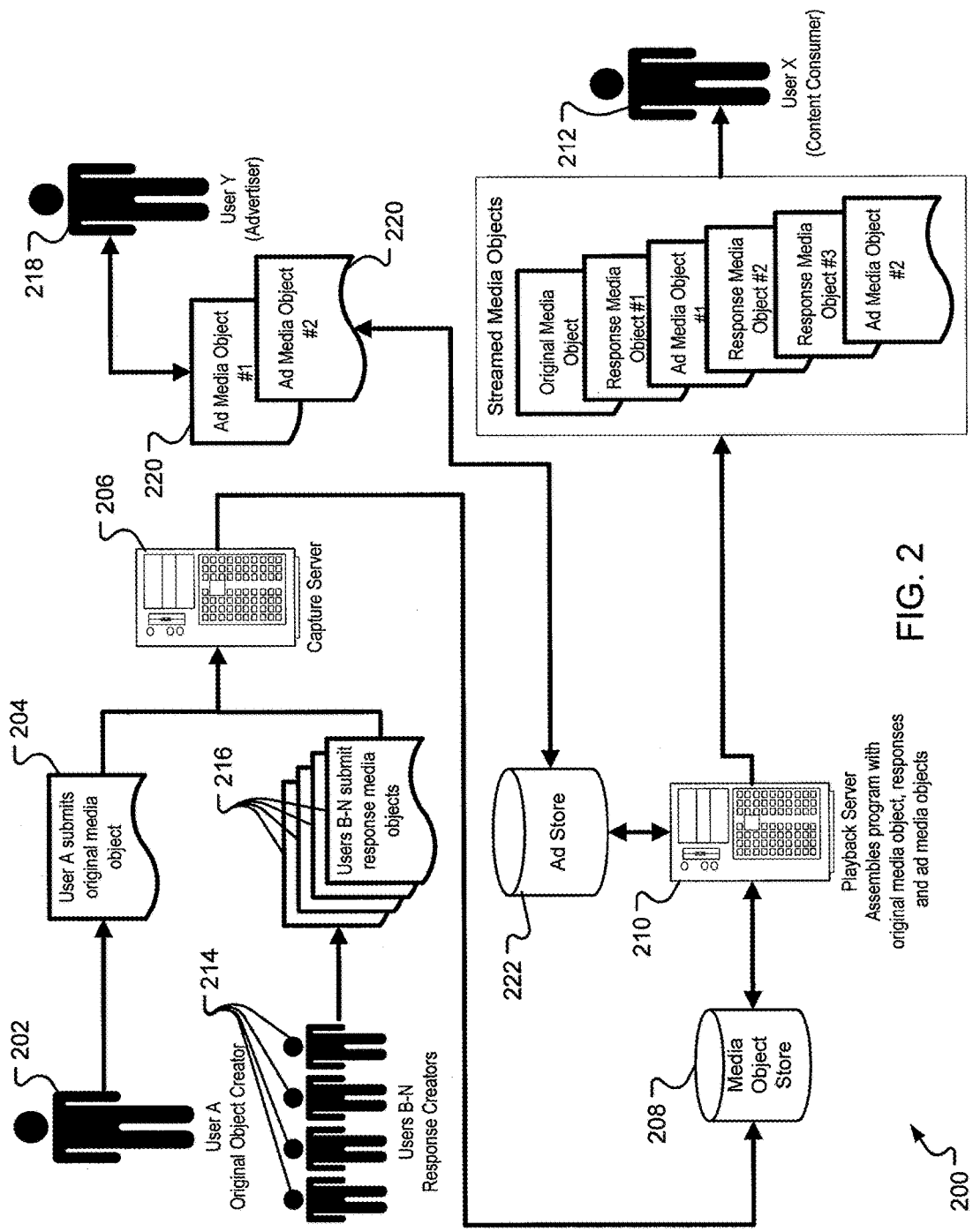
FIG. 2 illustrates an alternative embodiment of an architecture for viewing a collection of associated media objects.

FIG. 2 illustrates an alternative embodiment of an architecture for viewing a collection of associated media objects. In the architecture 200 shown, a first user, user A 202, creates an original media object 204, such as a video clip or other media content. In an embodiment the original media object 204 may include any additional associated content such as text, tags, descriptors, author identifier or other content associated with the video clip. Alternatively, such additional content may be stored independently of the original media object 204.

The original media object 204 is uploaded by user A 202 to a media object capture server 206. The media object capture server 206 then stores the original media object 204 in a media object store 208. The original media object 204 is published, i.e., made accessible via a communications network, to consumers 212 via a media object playback server 210.

In the architecture shown, users B through N 214 create and submit response media objects, or responses 216, that either comment on or are otherwise submitted in a way that associates the responses 216 with the original media object 204. The responses 216, like the original media object 204, may be any type of media content or may be limited by the architecture to certain predetermined types of content. The responses are individually submitted to the media object capture server 206 by their respective creator 214 and stored in the media object store 208.

The architecture 200 also includes an advertiser 218 (user Y) that supplies one or more (two are shown) advertisements 220 in the form of media objects for use by the media object playback server 210. In the embodiment shown, the advertisements may be stored in the ad store 222, in the media object store 208 or both.

As described above, the playback server 210 provides consumers 212 with an option to request a consolidated stream containing a media object and any associated responses. In response to a consolidated render request from a content consumer 212 (user X), the playback server 210 identifies the appropriate media objects 204, 216 and generates a consolidated stream containing the identified objects 204, 216. In addition, the playback server 210 may insert one or more advertisements 220, transitions between adjacent media objects or other media content within the consolidated stream of media objects.

Figure 3:
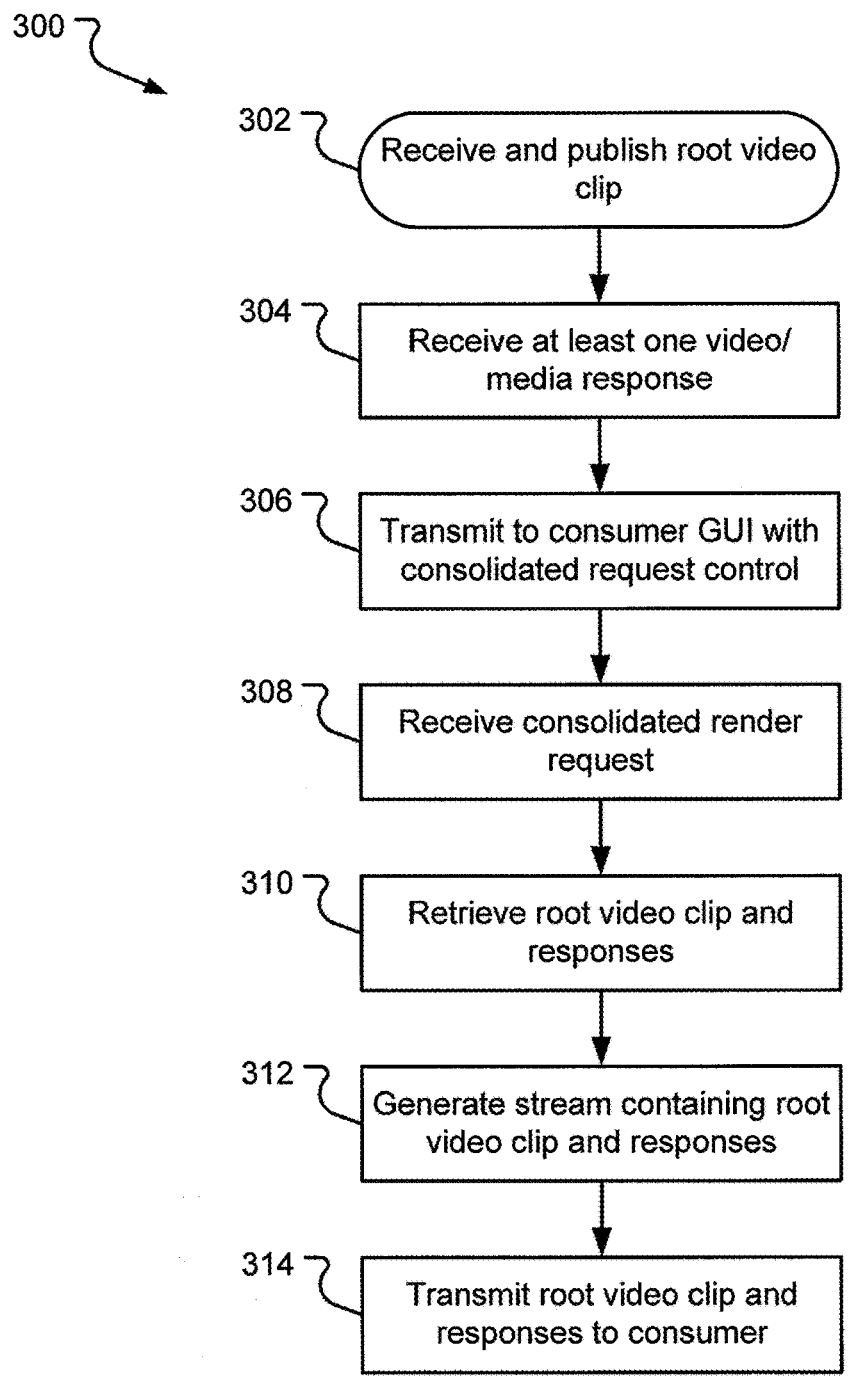
FIG. 3 illustrates an embodiment of a method for generating a consolidated stream of media data in response to a consolidated render request.

FIG. 3 illustrates an embodiment of a method for generating a consolidated stream of media data in response to a consolidated render request. In the embodiment shown, the original media object is a root video clip, but the reader will understand that the method could be applied to any type of media object.

The method 300 starts with receiving and publishing the root video clip in a publishing operation 302. This may include generating a web page for the root video clip and allowing users to view and submit responses to the root video clip.

One or more responses are received in a receive responses operation 304. Responses to the root video clip are received over a period of time and stored so that they are associated with the root video clip and can be easily so identified in later searching operations and for retrieval.

Figure 4:
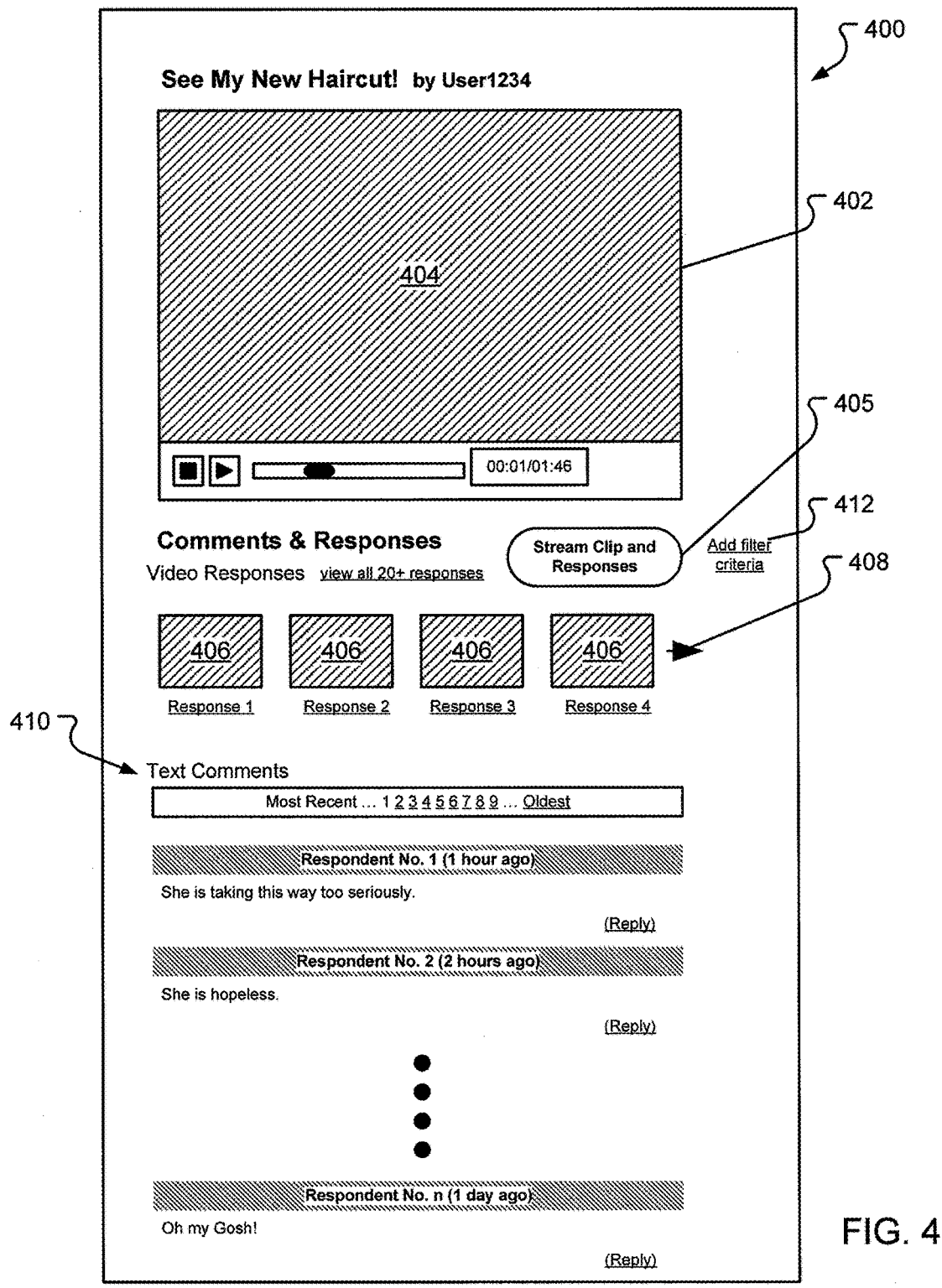
FIG. 4 illustrates an embodiment of graphical user interface with a consolidated render request control.

In transmit GUI operation 306, consumers wishing to view the root video clip are transmitted a GUI that includes a consolidated render request control, such as the GUI presented in FIG. 4. Through this control, a consumer may transmit a consolidated render request. The GUI may further includes one or more controls that allow the consolidated render request to be limited with filter criteria or to include sequence criteria. In an embodiment, if no limitations are selected by the consumer in the request, the system may, by default, transmit the root video clip followed by all responses in a sequence corresponding to either the order in which they were received or some other predetermined order such as by popularity rank.

A consolidated render request generated by a consumer selecting the consolidated render request control on the GUI is received in receive request operation 308. In response, the root video clip and/or all responses identified in the request are retrieved from storage or from an intermediate cache in a retrieval operation 310.

In the embodiment shown, a stream containing the retrieved video clip and/or responses is generated in a generation operation 312. The generation operation 312 may include changing the format of one or more of the retrieved video clip and/or responses to make them suitable for rendering on the requesting consumer's device. In addition, sponsored advertisements and/or transitions can be inserted or placed between the clips in the stream as deemed appropriate by the content of the stream or the tags associated with the video clips and responses. Alternatively, advertisements or other content may be placed in the stream so that they appear concurrently with an original media object or response. For example, an advertisement may be placed so as to appear as a ticker or banner in a lower portion of the video display, either covering the underlying video content or by momentarily changing the aspect ratio of the video content.

A transmission operation 314 then transmits the stream containing the retrieved video clip and/or responses to the consumer's device. In an alternative embodiment of the method previously discussed, the retrieved video clip and/or responses may be transmitted individually for sequential rendering by the consumer's device. The transmission includes an indication to the receiving device of the sequence for rendering the video clip and video responses. The indication may be as simple as the order for rendering or may be some data appended to each individual transmission.

The generation and transmission operations 312, 314 may be performed simultaneously. For example, upon a consumer's selection of the consolidated render control, an embedded video player is presented on the GUI and video begins playback by streaming the first clip to the consumer's device for rendering by the video player. As the video plays, the playback server queues up and/or converts (if the upcoming response is not currently in video form) and queues up the next response. When the first clip ends, the first response is streamed and starts rendering on the consumer's device, with a possible transition effect (e.g., fade, cut, sweep) between the clips to make the transition appear seamless. The transition may also include auto generated titles introducing the next clip. For example, the screen could fade to white and letters appear stating, "Response From LonelyGirl15" and then fade into the response from LonelyGirl15. This next clip response is played and steps are repeated until the end of the set of responses is reached or until the users terminates the playback. An advertisement may be inserted within the stream such as between any two responses, such advertisements being selected based on some criteria possibly associated with the root video clip, or the previous or following response.

Some variations in the content of the consolidated stream are possible. For example, a consumer may select such filter/sequence criteria as, for example: "Only show me a set of responses that enforce their political point of view"; "Only show me top X number of responses"; "Only show me a program X minutes in duration"; "Only show me responses with a rating level over X"; "Only show me responses with a specific tag or set of tags"; "Only show me responses from my social network"; and/or "Don't show me ads (for consumers that have paid for this privilege by purchasing a premium membership)".

The method 300 could also be used to generate a downloadable media object instead of a real-time stream, such as a podcast, which can then be viewed on a mobile device, phone or media player.

The systems and methods described herein greatly improve the user experience when reviewing clips and their responses and further allows non-video responses to be integrated into the response stream. The consolidated stream may be customized by a user based on individual preference. In addition, a monetization channel is provided by creating advertisement insertion opportunities where none existed before (studies have shown that pre and post roll advertisements do not fare well) whereas these advertisements appear in a familiar commercial/interstitial format.

FIG. 4 illustrates an embodiment of a GUI with a consolidated render request control. The GUI 400 includes an embedded video player 402 with a video rendering area 404, illustrated with one embodiment of standard control elements (buttons, timeline, etc.) for controlling the playback of a media stream or a downloaded/locally stored media object. In an embodiment, the GUI 400 is a web page dedicated to a root video clip, the first frame of which may be displayed in the video area 404. Video responses to the root video clip are indicated by showing their first frame in smaller, video response thumbnail frames 406. More video responses may be accessed via selection of a show more video responses control 408. Textual responses are shown in a text responses listing 410 with various controls for viewing additional listings of the textual responses.

In the embodiment shown, a consolidated render request control 405 is provided in the form of a user-selectable button control element. A user may select this button 406 to generate a consolidated render request and begin rendering the consolidated stream in the video playback area 404. A user may input default filter and sequence criteria via another GUI, e.g., a filter criteria GUI (not shown), that may be accessible by command menu, e.g., a File, Edit, View menu (not shown) associated with the media player or the GUI 400 or via a linked control 412 provided for that purpose on the GUI 400. Alternatively, a filter criteria GUI may be presented to a user upon selection of the consolidated render control 405.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, a user may be presented with a view video clip and all responses control on a search results page, so that a user need not first be presented with a video clip web page before the user can issue the request to view all the video responses. Some amount of information may be provided on the search results listing to indicate how many video responses there are.

Numerous other changes may be made that will readily suggest themselves to those skilled in the art and which are encompassed in the spirit of the invention disclosed and as defined in the appended claims.

What is claimed is:

1. A method comprising:
communicating, over a network by a computing device, a digital video clip to a plurality of users, said communication comprising publishing, on a network platform hosted by the computing device on the network, the digital video clip, said publishing enabling each of the plurality of users to play the video clip;
receiving, over the network at the computing device from a device associated with a subset of the plurality of users, a video response file, each received video response file comprising user generated content (UGC) generated by each subset user, each response file having an individual format chosen from a group of individual formats consisting of text, audio and video, each individual format having different rendering characteristics;
storing, via the computing device in an associated database, each received video response file in association with said digital video clip;
generating and communicating, via the computing device, a graphical user interface (GUI) to each subset user, said GUI comprising a viewing region, a video response region and a control element that, upon selection, generates a request to compile a media stream from the video clip and at least one stored video response file;
receiving, at the computing device, a request from a first user, wherein said request was generated and sent to the computing device from a device of the first user upon said first user interacting with said control element of the received GUI;
generating, via the computing device in response to said first user request, a consolidated media stream comprising the video clip and each of the video response files, generating said consolidated media stream comprising:
determining a first video format for the consolidated media stream based on capabilities of the first user device, and
converting any of the video clip and associated video response files from a first format to a second format that complies with said first user device capabilities prior to said communication of the consolidated media stream,
said consolidated media stream further comprising rendering instructions defining at least each file's different rendering characteristics so as to adjust how each response file is rendered based on each response file's individual format; and communicating, via the computing device, said consolidated media stream to the first user, said communication causing the consolidated media stream to be played within the viewing region of the GUI in accordance with said rendering instructions.

2. The method of claim 1, further comprising:
generating a webpage for the video clip, wherein said communication further comprises communicating information to each of the plurality of users that enables them to access the webpage, view the video clip from the webpage and submit video responses files.

3. The method of claim 1, further comprising:
receiving, from a user within said plurality of users, a video clip, wherein said communicated video clip is the received video clip from the user; and
storing, in said database, said received video clip.

4. The method of claim 1, wherein said GUI is communicated to a second plurality of users different from said plurality of users, wherein said first user is within said second plurality of users.

5. The method of claim 1, wherein said communication of the consolidated media stream comprises sending the video file and each video response file to the first user device for rendering via a single rendering operation.

6. The method of claim 1, wherein said first user request comprises information identifying the video response files and not the video clip, wherein said consolidated media stream is generated so that only the video response files are included.

7. The method of claim 6, wherein said first user request further identifies only a portion of the video response files, wherein said consolidated media stream is generated so that only said portion of the video response files are included.

8. The method of claim 1, wherein said communication of the consolidated media stream further comprises:
independently transmitting each of the video clip and at least one video response file to the first user device; and
indicating to the first user device a sequence for rendering the transmitted video clip and the video response files.

9. The method of claim 1, further comprising:
identifying an additional content file not included in said stored video clip and the video response files;
modifying the consolidated media stream to include said additional content file; and
communicating the modified consolidated media stream to the first user in response to said first user request.

10. A non-transitory computer-readable storage medium tangibly encoded with computer-executable instructions, that when executed by a computing device, perform a method comprising:
communicating, over a network by the computing device, a digital video clip to a plurality of users, said communication comprising publishing, on a network platform hosted by the computing device on the network, the digital video clip, said publishing enabling each of the plurality of users to play the video clip;
receiving, over the network at the computing device from a device associated with a subset of the plurality of users, a video response file, each received video response file comprising user generated content (UGC) generated by each subset user, each response file having an individual format chosen from a group of individual formats consisting of text, audio and video, each individual format having different rendering characteristics;
storing, via the computing device in an associated database, each received video response file in association with said digital video clip;
generating and communicating, via the computing device, a graphical user interface (GUI) to each subset user, said GUI comprising a viewing region, a video response region and a control element that, upon selection, generates a request to compile a media stream from the video clip and at least one stored video response file;
receiving, at the computing device, a request from a first user, wherein said request was generated and sent to the computing device from a device of the first user upon said first user interacting with said control element of the received GUI;
generating, via the computing device in response to said first user request, a consolidated media stream comprising the video clip and each of the video response files, generating said consolidated media stream comprising:
determining a first video format for the consolidated media stream based on capabilities of the first user device, and
converting any of the video clip and associated video response files from a first format to a second format that complies with said first user device capabilities prior to said communication of the consolidated media stream,
said consolidated media stream further comprising rendering instructions defining at least each file's different rendering characteristics so as to adjust how each response file is rendered based on each response file's individual format; and
communicating, via the computing device, said consolidated media stream to the first user, said communication causing the consolidated media stream to be played within the viewing region of the GUI in accordance with said rendering instructions.

11. The non-transitory computer-readable storage medium of claim 10, further comprising:
generating a webpage for the video clip, wherein said communication further comprises communicating information to each of the plurality of users that enables them to access the webpage, view the video clip from the webpage and submit video responses files.

12. The non-transitory computer-readable storage medium of claim 10, further comprising:
receiving, from a user within said plurality of users, a video clip, wherein said communicated video clip is the received video clip from the user; and
storing, in said database, said received video clip.

13. The non-transitory computer-readable storage medium of claim 10, wherein said communication of the consolidated media stream comprises sending the video file and each video response file to the first user device for rendering via a single rendering operation.

14. The non-transitory computer-readable storage medium of claim 10, wherein said first user request comprises information identifying only a portion of the files stored in said database, wherein said consolidated media stream is generated so that only said portion is included.

15. The non-transitory computer-readable storage medium of claim 10, wherein said communication of the consolidated media stream further comprises:

independently transmitting each of the video clip and at least one video response file to the first user device; and indicating to the first user device a sequence for rendering the transmitted video clip and the video response files.

16. The non-transitory computer-readable storage medium of claim 10, further comprising:

identifying an additional content file not included in said stored video clip and the video response files;

modifying the consolidated media stream to include said additional content file; and communicating the modified consolidated media stream to the first user in response to said first user request.

* * * * *